(12) United States Patent
Nakamura

(10) Patent No.: US 8,248,631 B2
(45) Date of Patent: Aug. 21, 2012

(54) IMAGE FORMING APPARATUS CAPABLE OF ALLOWING FORMING IMAGES OF ALL OF THE IDENTIFIED TYPES WITH RESPECT TO DETERMINATION INFORMATION

(75) Inventor: Shouichi Nakamura, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 575 days.

(21) Appl. No.: 12/471,262

(22) Filed: May 22, 2009

(65) Prior Publication Data

US 2009/0296148 A1   Dec. 3, 2009

(30) Foreign Application Priority Data

May 30, 2008   (JP) .................................. 2008-142156

(51) Int. Cl.
*G06K 15/00* (2006.01)

(52) U.S. Cl. ........ 358/1.14; 358/1.15; 358/1.2; 358/1.9; 347/5; 347/16; 347/103; 347/252; 399/9; 399/301

(58) Field of Classification Search ................. 358/1.14, 358/1.15
See application file for complete search history.

(56) References Cited

U.S. PATENT DOCUMENTS 6,204,927 B1 *   3/2001   Saito et al. ................... 358/1.12
7,990,557 B2 *   8/2011   Tsunekawa ................... 358/1.15
2009/0021782 A1 * 1/2009   Morimoto ..................... 358/1.15

FOREIGN PATENT DOCUMENTS

JP   2000-147943   5/2000

OTHER PUBLICATIONS

English Machine Translation of JP 2000-147943-A (Isemura, Published May 26, 2000).*

* cited by examiner

*Primary Examiner* — Benny Q Tieu
*Assistant Examiner* — Juan Guillermety
(74) *Attorney, Agent, or Firm* — Squire Sanders (US) LLP

(57) ABSTRACT

An image forming apparatus includes: an image forming unit for forming a plurality of images on sheets; a receiving unit for receiving job information including identification information for identifying types of the plurality of images and determination information for determining timing of forming the plurality of images on the sheets, from an external instrument; and a control unit for identifying the types of the plurality of images based on the identification information received by the receiving unit, determining the timing of forming the plurality of images on the sheets based on the determination information received by the receiving unit, and allowing the image forming unit to form the plurality of images based on the identified types of the images and on the determined timing.

4 Claims, 9 Drawing Sheets

FIG.3

| RAM ADDRESS | CONTENTS | |
|---|---|---|
| xxxx | SETTING INFORMATION | JOB 1 |
| | IMAGE INFORMATION | |
| | .... | |
| yyyy | PRINT INFORMATION: ONE SURFACE | SETTING INFORMATION |
| | PRINT MODE INFORMATION: PRODUCTION PRINT INFORMATION | |
| | SHEET DISCHARGE DESTINATION INFORMATION: MAIN TRAY 1 | |
| | SHEET FEED TRAY INFORMATION: TRAY 1 | JOB 2 |
| | .... | |
| | IMAGE page 1 (COMPRESSION MEMORY ADDRESS aaaa) | IMAGE INFORMATION |
| | IMAGE page 2 (COMPRESSION MEMORY ADDRESS bbbb) | |
| | .... | |
| zzz | | JOB 3 |
| | | |

PRINT MODE INFORMATION

PRODUCTION PRINT MODE INFORMATION
CONFIRMATION PRINT MODE INFORMATION
PROCEDURE MANUAL PRINT MODE INFORMATION

FIG.4

| PAGE INFORMATION | CONTENTS | |
|---|---|---|
| 1 | SIZE INFORMATION: 1234×5278 | PAGE HEADER INFORMATION |
| | ATTRIBUTE INFORMATION: PROCEDURE MANUAL | |
| | | |
| | ... | |
| | IMAGE DATA | |
| 2 | SIZE INFORMATION: 1234×5278 | PAGE HEADER INFORMATION |
| | ATTRIBUTE INFORMATION: FOR IMAGE FORMING | |
| | | |
| | ... | |
| | IMAGE DATA | |
| 3 | SIZE INFORMATION: 1234×5278 | PAGE HEADER INFORMATION |
| | ATTRIBUTE INFORMATION: FOR IMAGE FORMING | |
| | | |
| | ... | |
| | IMAGE DATA | |

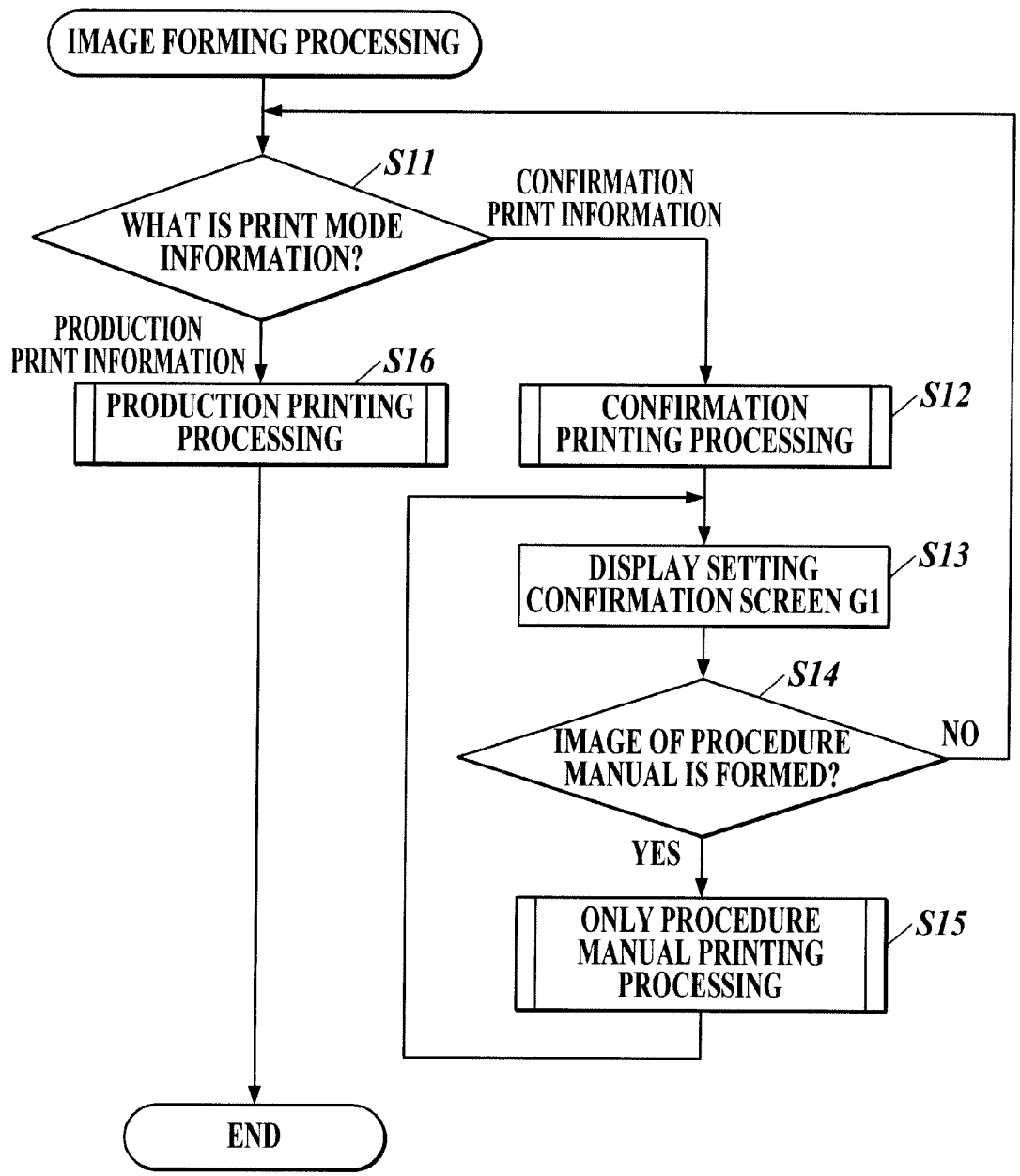

FIG. 6

SETTING CONFIRMATION

| TRAY1 | ⇨ ⇨ CUSTOM NORMAL 72-91g | TRAY3 | ⇨ ⇨ CUSTOM NORMAL 72-91g | TRAY6 | ⇨ ⇨ CUSTOM NORMAL 72-91g |
|---|---|---|---|---|---|
| TRAY2 | ⇨ ⇨ CUSTOM NORMAL 72-91g | TRAY4 | ⇨ ⇨ CUSTOM NORMAL 72-91g | TRAY7 | ⇨ ⇨ CUSTOM NORMAL 72-91g |
|  |  | TRAY5 | ⇨ ⇨ CUSTOM NORMAL 72-91g | TRAY8 | ⇨ ⇨ CUSTOM NORMAL 72-91g |

ROTATE IMAGE | AUTOMATIC

| NUMBER OF SHEETS/PRINTING SURFACE | | OUTPUT SETTING | |
|---|---|---|---|
| SET NUMBER OF SHEETS | 0001 | SHEET DISCHARGE TRAY | MULTI-FOLDING MAIN TRAY |
| PRINTING SURFACE | SINGLE TO SINGLE   SINGLE TO DOUBLE<br>DOUBLE TO SINGLE   DOUBLE TO DOUBLE | DOUBLE SIDE BINDING DIRECTION | CROSSWISE   UPWARD   STORE<br>STORE IN HDD   NONE |
| ORIGINAL SETTING | | DISCHARGED SHEET SURFACE/<br>SHEET DISCHARGE ORDER | FACEDOWN   FACEUP<br>FORWARD DIRECTION   REVERSE DIRECTION |
| ORIGINAL SETTING DIRECTION | UPWARD   DOWNWARD   LEFTWARD   RIGHTWARD | SORT/GROUP | SORT   GROUP   ASSORTMENT |
| DOUBLE SIDE BINDING DIRECTION | CROSSWISE   UPWARD | STAPLE | |
| SPECIAL ORIGINAL | NORMAL   MIXED   Z-FOLDING   ONE SHEET FEED | SADDLE STITCH BINDING | |
| ORIGINAL SIZE | STANDARD   NON-STANDARD   INDEX | LAP CENTER FOLDING | |
| IMAGE QUALITY SETTING | | LAP THREE FOLDING | |
| ORIGINAL IMAGE QUALITY | CHARACTER/PHOTOGRAPH   LIGHT CHARACTER<br>PHOTOGRAPH   CHARACTER | PUNCHED HOLE(S) | NONE   LEFT   RIGHT   UPPER |
| PRINTING DENSITY | AUTOMATIC DENSITY   -4 -3 -2 -1 0 +1 +2 +3 +4 | FOLDING | NONE   Z-FOLDING   INSIDE THREE FOLDING<br>OUTSIDE THREE FOLDING<br>DOUBLE PARALLEL FOLDING<br>GATE FOLDING   CENTER FOLDING |
| BACKGROUND ADJUSTMENT | NORMAL   -4 -3 -2 -1 0 +1 +2 +3 +4 | | |
| SHARPNESS | NORMAL   -4 -3 -2 -1 0 +1 +2 +3 +4 | | |
| CHARACTER/PHOTOGRAPH DETERMINATION | NORMAL   -4 -3 -2 -1 0 +1 +2 +3 +4 | CASE BINDING | |
| MAGNIFICATION SETTING | | APPLICATION SETTING | |
| MAGNIFICATION LONGITUDINAL 1.000 | AUTOMATIC MAGNIFICATION   REDUCE   ONE-TO-ONE   ENLARGE | | |
| MAGNIFICATION LATERAL 1.000 | MANUAL MAGNIFICATION   REGISTERED 1   REGISTERED 2   REGISTERED 3 | | |

B1 | OUTPUT PROCEDURE MANUAL | COPY FOR CONFIRMATION | CLOSE

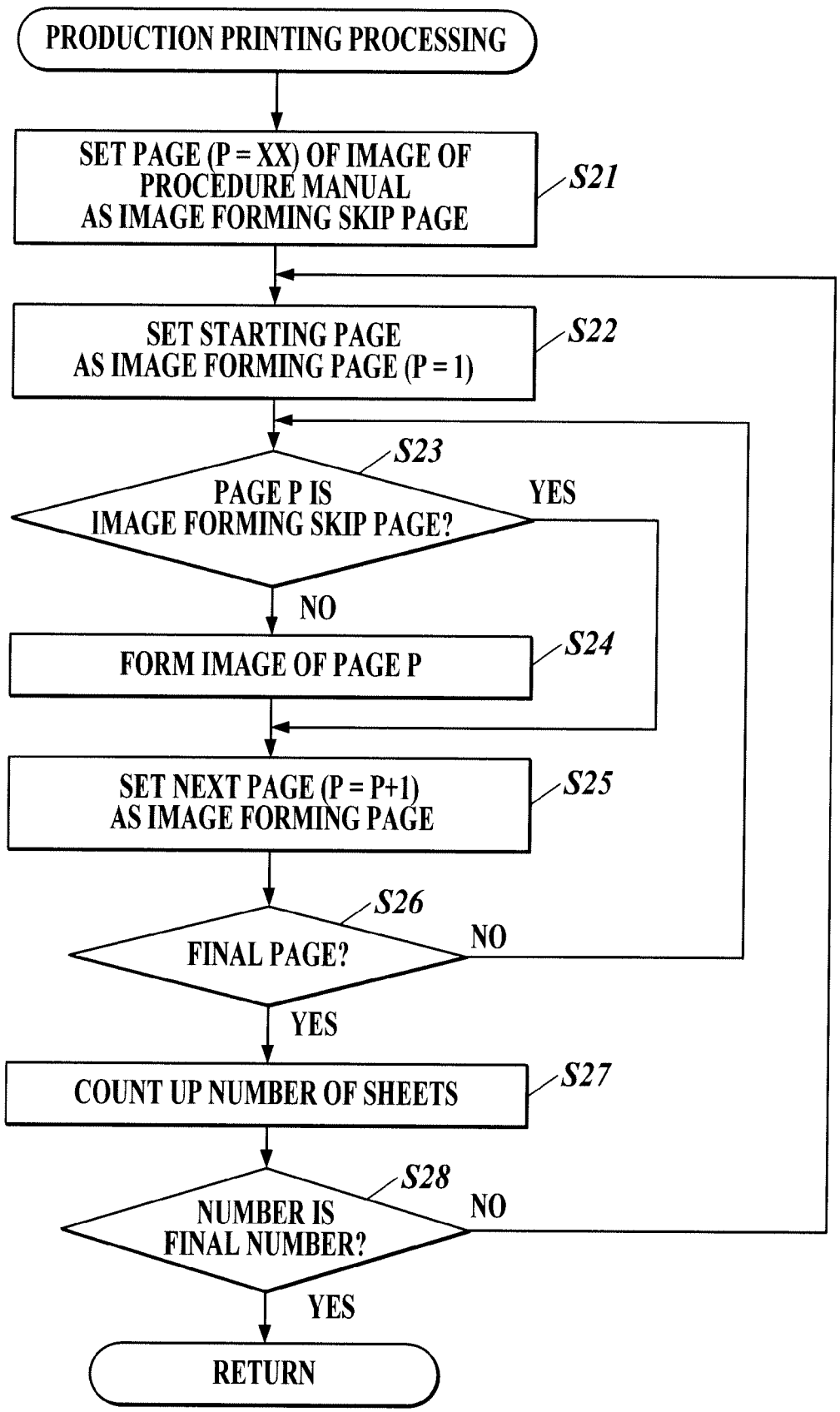

IMAGE FORMING APPARATUS CAPABLE OF ALLOWING FORMING IMAGES OF ALL OF THE IDENTIFIED TYPES WITH RESPECT TO DETERMINATION INFORMATION

BACKGROUND OF THE INVENTION

1. Field of the Invention

The present invention relates to an image forming apparatus.

2. Description of the Related Art

In recent years, in the print on demand (POD) market, a mode in which image data of an original is digitized, and dedicated operators (users) process the digitized image data individually for each of steps (for example, a proofreading step, an image forming step and the like), has been general. For example, the user performs processing for forming an image of the image data on sheets based on an operation procedure manual in which setting information of a job for forming the image on the sheets, and the like are described.

In such an operation mode of the POD, the image data of such an original image (hereinafter, an image for image forming) is digitized, and is delivered as job information among the respective steps. However, the operation procedure manual is delivered in a form of paper medium among the steps. Accordingly, it is preferable to realize a mode that image data of the operation procedure manual is digitized and job information including the image data of the operation procedure manual and the image data of the image for the image forming is delivered among the respective steps.

In the case of delivering the above-described job information among the steps, the image of the operation procedure manual and the image for the image forming are different from each other in usage purpose. Accordingly, these images are also different in timing of being formed on the sheets. For example, the user allows the image of the operation procedure manual to be formed on the sheet, confirms contents of the operation procedure manual, and thereafter allows the image for the image forming to be formed on the sheets.

Moreover, a technology in which only an image of a specific original is skipped from among images of a plurality or originals, and the images of the originals other than the image of the skipped original are formed on the sheets, has been known (for example, refer to JP-Tokukai-2000-147943A).

However, in the case of the above-described patent document, the image (specific image) of the skipped specific original is not formed on the sheets all the time.

For example, it is assumed that, when the job information includes the image data of the operation procedure manual and the image data for the image forming, the image of the operation procedure manual is designated as the specific image by the user. In this case, the image of the operation procedure manual is skipped, and only the images for the image forming are formed on the sheets. Then, such a disadvantage that the user cannot allow the image of the operation procedure manual to be formed on the sheet though the users desires to form the above image at the time of confirming the contents of the operation procedure manual, is caused. Accordingly, it has been required to realize a technology for forming the specific image at appropriate timing.

SUMMARY OF THE INVENTION

Hence, it is a main object of the present invention to form the specific image at appropriate timing.

In order to realize at least one of objects as described above, an image forming apparatus reflecting one aspect of the present invention comprises:

an image forming unit for forming a plurality of images on sheets;

a receiving unit for receiving job information including identification information for identifying types of the plurality of images and determination information for determining timing of forming the plurality of images on the sheets, from an external instrument; and a control unit for identifying the types of the plurality of images based on the identification information received by the receiving unit, determining the timing of forming the plurality of images on the sheets based on the determination information received by the receiving unit, and allowing the image forming unit to form the plurality of images based on the identified types of the images and on the determined timing.

In the above-described image forming apparatus, it is preferable that the control unit identifies a specific image and the other images from the plurality of images based on the identification information, when the timing of forming the specific image on the sheet is determined based on the determination information, the control unit allows the image forming unit to form the specific image and does not allow the image forming unit to form the other images, and when the timing of forming the other images on the sheets is determined based on the determination information, the control unit allows the image forming unit to form the other images and does not allow the image forming unit to form the specific image.

In the above-described image forming apparatus, it is preferable that the identification information is attribute information indicating attributes of the plurality of images, and the control unit identifies the specific image and the other images based on the attribute information.

In the above-described image forming apparatus, it is preferable that the identification information is page information indicating the number of pages of the plurality of images, and the control unit identifies the specific image and the other images based on the page information.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 3 is a table showing an example of job information;

FIG. 4 is a table showing an example of image information;

FIG. 5 is a flowchart showing a flow of image forming processing;

FIG. 6 is a view showing a setting confirmation screen;

FIG. 7 is a flowchart showing a flow of production printing processing;

DETAILED DESCRIPTION OF PREFERRED EMBODIMENT

A description will be made of an embodiment according to the present invention with reference to the accompanying drawings. First, a description will be made of a schematic cross-sectional configuration of an image forming apparatus 1 with reference to FIG. 1.

Figure 1:
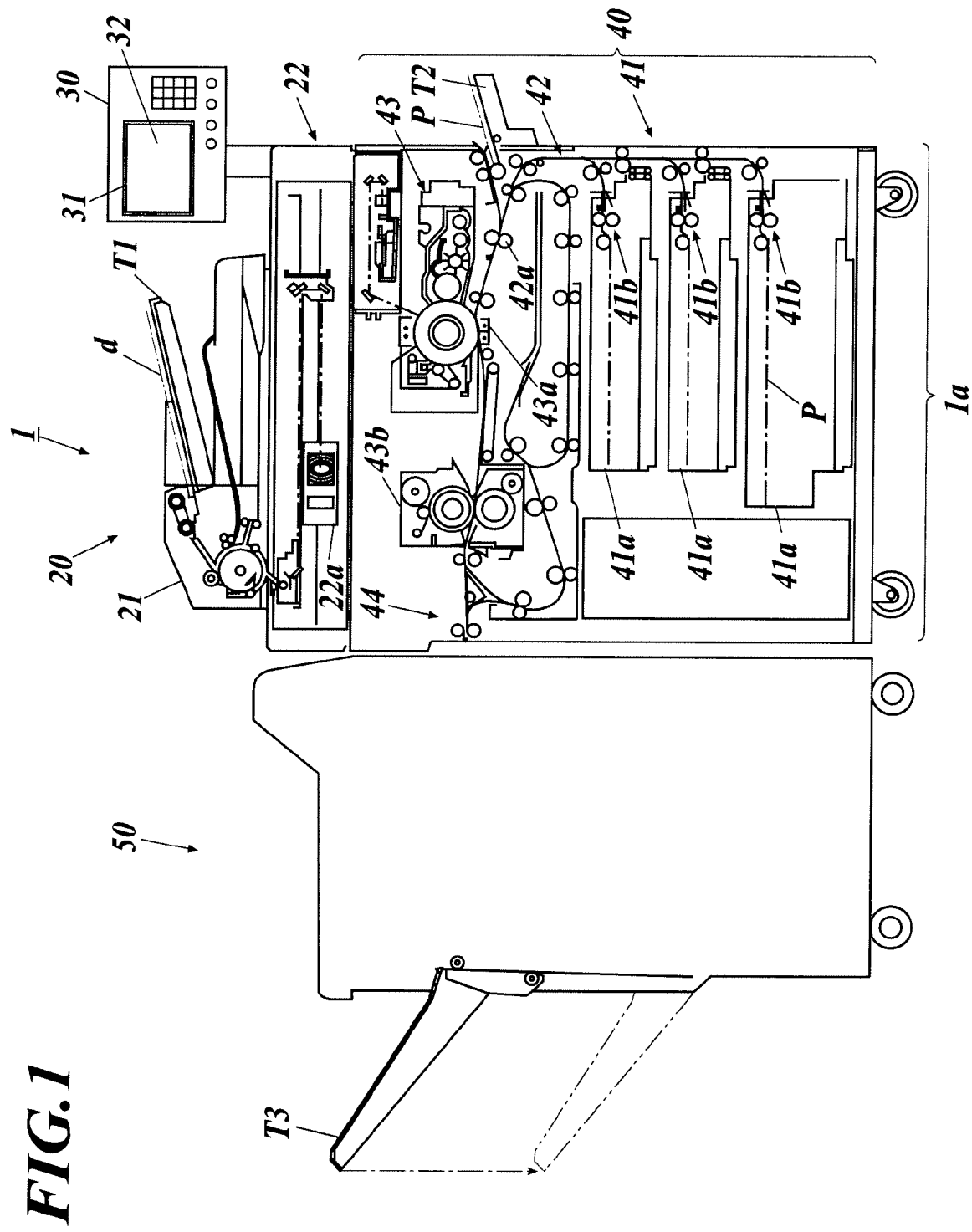
FIG. 1 is a schematic cross-sectional view of an image forming apparatus according to the present invention.

As shown in FIG. 1, the image forming apparatus 1 is a digital multifunction peripheral comprising: a body unit 1*a* that reads an image from an original to then form the read image on sheets P, receives page data including image data, and job information of a job, which includes setting information of image forming conditions or the like of each image data, from an external apparatus or the like, to then form an image on the sheets P based on the received job information, and the like; a post-processing unit 50 that carries out post processing for the sheets on which the image is formed; and the like. The body unit 1*a* comprises: an image reading unit 20; an operation display unit 30; a printing unit 40; and the like.

The image reading unit 20 comprises: an automatic original feed unit 21 called an auto document feeder (ADF); and a reading unit 22, and realizes a function to read images of a plurality of the originals based on the setting information received by the operation display unit 30. An original d mounted on an original tray T1 of the automatic original feed unit 21 is conveyed to a contact glass as a reading spot of the reading unit 22. Then, an image of one surface of the original d or images of both surfaces thereof are scanned by an optical system of the reading unit 22, and the image of the original d is then read by a charge coupled device (CCD) 22*a*. Here, the term "image" includes not only image data of graphic forms, photographs and the like but also text data of characters, symbols and the like.

The image data (analog image signal) read by the image reading unit 20 is outputted to a reading processing unit 140 of an image control board to be described later. Then, A/D conversion and a variety of image processing are carried out for the image in the reading processing unit 140, and the image is then outputted to the printing unit 40.

The operation display unit 30 comprises a liquid crystal display (LCD) 31, a touch panel 32 provided so as to cover the LCD 31, and further, an operation key group (not shown). The operation display unit 30 receives an instruction from a user, and outputs an operation signal thereof to a control unit 110. Moreover, in accordance with display signals inputted from the control unit 110, the operation display unit 30 displays a variety of setting screens for inputting varieties of operation instructions and setting information, results of a variety of processing, and the like.

The LCD 31 functions as a display unit that displays an operation screen having a plurality of buttons indicating a variety of operation instructions. The LCD 31 outputs the operation signal indicating the instruction received by each of the screens, to the control unit 110 to be described later.

Moreover, the touch panel 32 receives a selection instruction for the buttons on the operation screen based on a depression signal on the operation screen.

Based on inputted printing data, the printing unit 40 performs electrophotographic image forming processing. The printing unit 40 comprises: a mounting unit 41; a sheet conveyor unit 42; an image forming unit 43; and a delivery unit 44.

The mounting unit 41 includes pluralities of sheet feed trays 41*a* and sheet feed units 41*b*, a manual feed tray T2, and the like. In the sheet feed trays 41*a*, the sheets P identified in advance for each of sheet types are housed for each thereof. Each of the sheet feed units 41*b* conveys the sheets P to the sheet conveyor unit 42 one by one from the uppermost. The manual feed tray T2 is capable of mounting various types of the sheets P thereon in accordance with needs of the user, and by sheet feed rollers, the sheets P mounted thereon to the sheet conveyor unit 42 are conveyed one by one from the uppermost.

The sheet conveyor unit 42 conveys the sheets P, which are conveyed from the sheet feed trays 41*a* or the manual feed tray T2, to a transferring device 43*a* through pluralities of intermediate rollers and resist rollers 42*a*, and the like. Moreover, the sheet conveyor unit 42 conveys the sheets P, on each one surface of which the image has been already formed, to a conveyor passage for double-sided printing by a conveyor passage switching plate, and conveys the sheets P to the transferring device 43*a* through the intermediate rollers and the resist rollers 42*a* again.

The image forming unit 43 includes: a photosensitive drum; an electric charging device; an exposure device; a development device; the transferring device 43*a*; a cleaning unit; and a fixing device 43*b*. Here, the exposure device includes a laser output unit that outputs a laser beam based on the image data, and a polygon mirror that scans the image in a main scanning direction by using the laser beam. The image forming unit 43 has a function to form the image on the sheets based on the job information. Specifically, the image forming unit 43 irradiates the photosensitive drum electrically charged by the electric charging device with the laser beam by the exposure device, to form an electrostatic latent image. Then, the development device adheres electrically charged toner onto a surface of the photosensitive drum on which the electrostatic latent image is formed, and thereby develops the electrostatic latent image. A toner image formed on the photosensitive drum by the development device is transferred onto the sheets P in the transferring device 43*a*. Moreover, after the toner image is transferred to the sheets P, residual toner and the like on the surface of the photosensitive drum are removed by the cleaning unit.

The fixing device 43*b* thermally fixes the toner image transferred onto the sheets P conveyed by the sheet conveyor unit 42. The sheets P for which fixing treatment is carried out are sandwiched by discharge rollers of the delivery unit 44, and are conveyed from a delivery port to the post-processing unit 50.

The post-processing unit 50 includes: a variety of post-processing units such as a sort unit that performs sort processing for the sheets P on which the image is formed, a folding unit that performs fold processing, a punch unit that performs punch processing, and a staple unit that performs staple processing for binding a bundle of the sheets P at a set binding position; a sheet discharge tray T3 that receives the discharged sheets P on which the image is formed by the body unit 1*a*, and the sheets P for which such a variety of post-processing is carried out, and stacks these sheets thereon; and the like.

Figure 2:
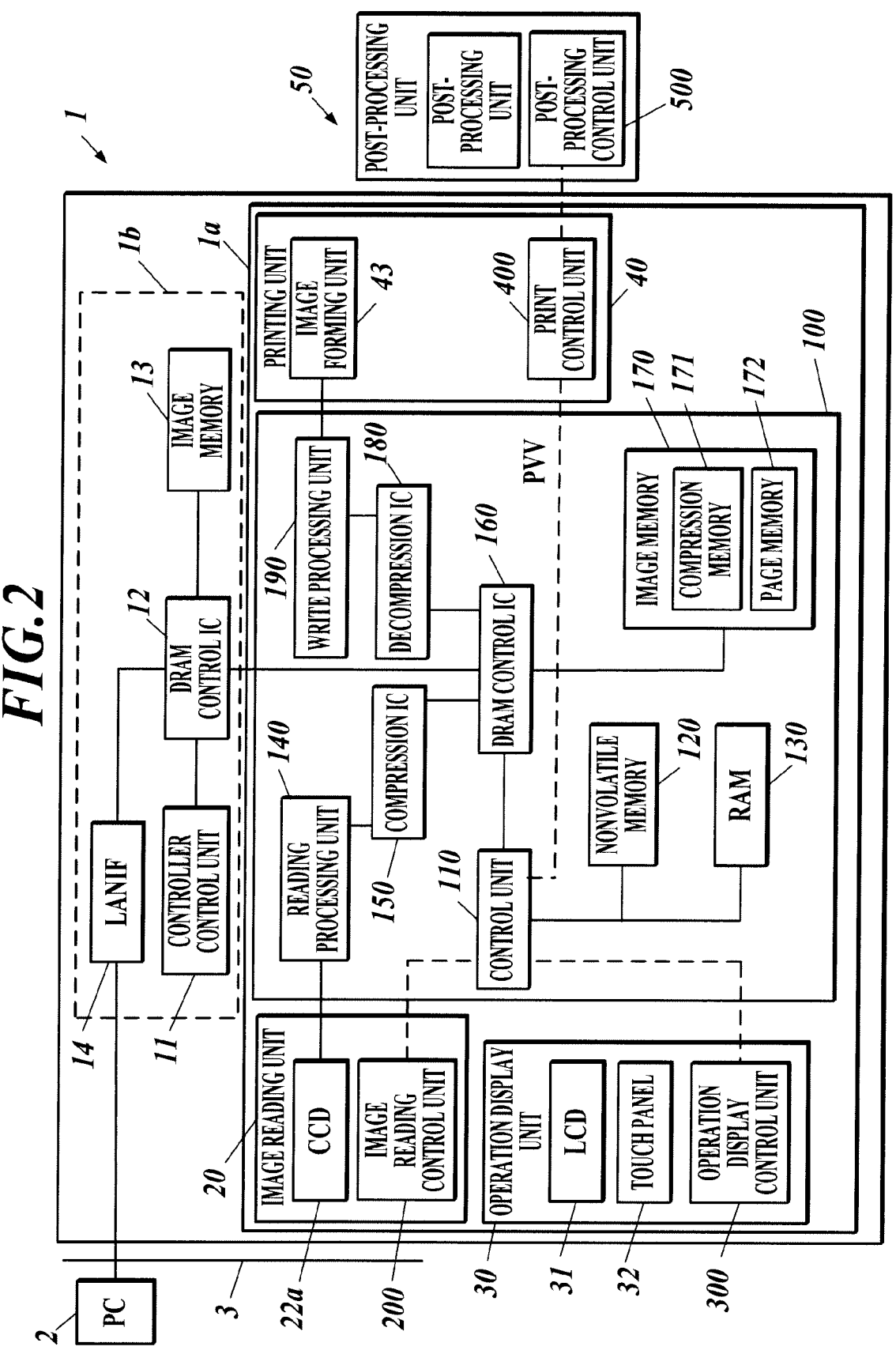
FIG. 2 is a control block diagram of the image forming apparatus.

FIG. 2 is a control block diagram of the image forming apparatus 1.

As shown in FIG. 2, the image forming apparatus 1 comprises: the body unit 1*a*; a printer controller 1*b*; and the post-processing unit 50 connected to the body unit 1*a*. The image forming apparatus 1 is connected to a PC 2 as an external apparatus on a network 3 through a local area network interface (LANIF) 14 as a receiving unit of the printer controller 1*b* so as to be capable of mutually transmitting information to the PC 2 and receiving the information from PC 2.

The body unit 1a comprises the image reading unit 20; the operation display unit 30; the printing unit 40; and the image control board 100. Note that the same reference numeral will be assigned to the same member as each member described with reference to FIG. 1, and a description thereof will be omitted.

The control board 100 comprises: the control unit 110; a nonvolatile memory 120; a random access memory (RAM) 130; the reading processing unit 140; a compression IC 150; a dynamic random access memory (DRAM) control IC 160; an image memory 170; a decompression IC 180; and a write processing unit 190.

The control unit 110 comprises a central processing unit (CPU) and the like. The control unit 110 reads out a system program stored in the nonvolatile memory 120 and a program designated from among a variety of application programs, expands the system program and the designated application program in the RAM 130, and executes a variety of processing in cooperation with the programs expanded in the RAM 130, thereby controls each unit of the image forming apparatus 1 in a centralizing manner.

In the case of receiving job information, which includes identification information for identifying types of a plurality of images and determination information for determining timing of forming the plurality of images on the sheets P, from the PC 2 through the LANIF 14, the control unit 110 identifies the types of the plurality of images based on the identification information, determines the timing of forming the respective images on the sheets P based on the determination information, and allows the image forming unit 43 to form the plurality of images based on the identified types of the images and on the determined timing.

The identification information is information for identifying the types of the images, and corresponds to attribute information to be described later. The determination information is information for determining the timing of forming the images on the sheets P, and corresponds to print mode information to be described later.

Specifically, the control unit 110 identifies a specific image and the other images with each other based on the attribute information. When the timing of forming the specific image on the sheet P is determined based on the print mode information, the control unit 110 allows the image forming unit 43 to form the specific image, and does not allow the image forming unit 43 to form the other images. Moreover, when the timing of forming the other images on the sheets P is determined based on the print mode information, the control unit 110 allows the image forming unit 43 to form the other images, and does not allow the image forming unit 43 to form the specific image.

The specific image refers to an image of an operation procedure manual or the images for the image forming. The image of the operation procedure refers to an image of the operation procedure manual in which setting information of the job, and the like are described. The images for the image forming refer to images to be formed, for example, in the image forming step of the POD.

For example, when the specific image is the operation procedure manual, the other images are the images for the image forming. In this case, the control unit 110 executes processing for allowing the image forming unit 43 to form the image of the operation procedure manual and for not allowing the image forming unit 43 to form the images for the image forming. Specifically, the control unit 110 executes processing for printing only the procedure manual, which is to be described later.

Moreover, when the specific image is the images for the image forming, the other images are the image of the operation procedure manual. In this case, the control unit 110 performs processing for allowing the image forming unit 43 to form the images for the image forming and for not allowing the image forming unit 43 to form the image of the operation procedure manual. Specifically, the control unit 110 executes production printing processing to be described later.

The nonvolatile memory 120 stores an image forming program according to this embodiment.

The RAM 130 forms work areas which temporarily store the variety of programs executed by the control unit 110 and the variety of data relating to these programs. Moreover, the RAM 130 stores the job information to be described later.

The reading processing unit 140 carries out a variety of processing such as analog processing, A/D conversion processing and shading processing for the analog image signal inputted from an image reading control unit 200 of the image reading unit 20, and then generates digital image data. The generated image data is outputted to the compression IC 150.

The compression IC 150 carries out compression processing for the inputted digital image data, and outputs the digital image data to the DRAM control IC 160.

In accordance with an instruction from the control unit 110, the DRAM control IC 160 controls the compression processing for the image data by the compression IC 150 and decompression processing for the compressed image data by the decompression IC 180. Moreover, the DRAM control IC 160 controls an input/output of the image data for the image memory 170.

For example, when an instruction to store the image signal read by the image reading unit 20 is received, the DRAM control IC 160 allows the compression IC 150 to execute the compression processing for the image data inputted from the reading processing unit 140, and to store the compressed image data in a compression memory 171 of the image memory 170. Moreover, when an instruction to print out the compressed image data stored in the compression memory 171 is received, the DRAM control IC 160 reads out the compressed image data from the compression memory 171, and allows the decompression IC 180 to carry out the decompression processing for the compressed image data, and to store the decompressed image data in a page memory 172. Furthermore, when an instruction to print out the image data stored in the page memory 172 is received, the DRAM control IC 160 reads out the image data from the page memory 172, and outputs the image data to the write processing unit 190.

The image memory 170 includes: the compression memory 171; and the page memory 172, each of which comprises a dynamic RAM (DRAM). The compression memory 171 is a memory for storing the compressed image data. The page memory 172 is a memory for temporarily storing the image data (print data) to be printed out.

The decompression IC 180 carries out the decompression processing for the compressed image data.

Based on the image data inputted from the DRAM control IC 160, the write processing unit 190 generates the print data for the image forming, and outputs the print data to the printing unit 40.

The image reading unit 20 comprises the CCD 22a, the image reading control unit 200, and further comprises the automatic original feed unit 21, the reading unit 22 and the like, which are shown in FIG. 1 (not shown in FIG. 2). The image reading control unit 200 controls the automatic original feed unit 21, the reading unit 22 and the like to execute exposure scanning for the surface of the original, and allows the CCD 22a to perform photoelectric conversion for reflected light. Therefore, the image is read. The read analog image signal is outputted to the reading processing unit 140.

The operation display unit 30 comprises the LCD 31, the touch panel 32, and an operation display control unit 300, and further comprises the operation key group such as a ten-key pad. In accordance with the display signals inputted from the control unit 110, the operation display control unit 300 allows the LCD 31 to display the variety of screens for inputting the variety of setting conditions, the results of the variety of processing, and the like. Moreover, the operation display control unit 300 outputs an operation signal, which is inputted from varieties of switches and buttons, the ten-key pad, the operation key group, the touch panel 32 or the like, to the control unit 110.

The printing unit 40 includes: each unit such as the image forming unit 43 shown in FIG. 1, which relate to the print output; and the print control unit 400. The print control unit 400 controls the operations of each unit such as the image forming unit 43 of the printing unit 40 in accordance with instructions from the control unit 110, and allows each unit to form the image on the sheets P based on the print data inputted from the write processing unit 190. In addition, the printing unit 40 outputs instruction signals for operating each unit of the post-processing unit 50 to the post-processing control unit 500 in accordance with an instruction from the control unit 110.

The post-processing unit 50 includes: a variety of post-processing units; conveyor members such as conveyor rollers which convey the sheets P to the variety of post-processing units; and the sheet discharge tray T3 to which the sheets P conveyed from the variety of post-processing units are discharged; and the like. The variety of post-processing units are controlled by the post-processing control unit 500 in a comprehensive manner. In response to an instruction signal relating to the post processing, which is inputted from the control unit 110 through the print control unit 400, the post-processing control unit 500 conveys the sheets P to a predetermined post-processing unit along a conveyor passage, controls each unit so as to be driven to perform predetermined post processing for the sheets P, and to discharge the processed sheets P to the sheet discharge tray T3.

Next, a description will be made of each unit of the printer controller 1b. The printer controller 1b is one that manages and controls the image data and the job, which are inputted to the image forming apparatus 1 from the PC 2 connected to the network 3, in the case of using the image forming apparatus 1 as a network printer. The printer controller 1b receives data from the PC 2, and transmits the received data as the image data and the job, which are associated with the operation manual, to the body unit 1a.

The printer controller 1b comprises: a controller control unit 11; a DRAM control IC 12; an image memory 13; and the LANIF 14.

The controller control unit 11 controls the operations of each unit of the printer controller 1b in a comprehensive manner, and transmits the data, which is inputted from the PC 2, as the job through the LANIF 14, to the body unit 1a.

The DRAM control IC 12 controls the storing of the data, which is received by the LANIF 14, in the image memory 13, and controls the reading out of the data from the image memory 13. Moreover, the DRAM control IC 12 is connected to the DRAM control IC 160 of the image control board 100 by a peripheral components interconnect (PCI) bus. In accordance with an instruction from the controller control unit 11, the DRAM control IC 12 reads out the data for printing from the image memory 13, and outputs the data to the DRAM control IC 160.

The image memory 13 comprises a DRAM, and temporarily stores the received output data.

The LANIF 14 is a communication interface, such as a network interface card (NIC) and a modem, for connecting to the network 3 such as the LAN. The LANIF 14 receives the data from the PC 2. The received data is outputted to the DRAM control IC 12.

Subsequently, a description will be made of an example of the job information with reference to FIG. 3.

The job information is stored in the work area of the RAM 130 for each job. RAM addresses indicate addresses of the work areas of the RAM 130. For example, job information "job 1" is stored in a RAM address "xxxx". Specifically, the job information comprises the setting information and image information. The setting information is a variety of setting information for forming the images on the sheets P, and is information preset by the user. The image information is information regarding the images to be formed on the sheets P.

The setting information comprises print information, the print mode information, sheet discharge destination information, sheet feed tray information. The print information is information for determining whether to form the images on both surfaces or one surface of each of the sheets P. The print mode information is information for determining the timing of forming the images on the sheets P. The print mode information comprises production print mode information, confirmation print mode information, and procedure manual print mode information.

The production print mode information is information indicating the timing of forming the images for the image forming. Hereinafter, the formation of the images for the image forming on the sheets P refers to production printing.

The confirmation print mode information is information indicating timing of forming an image for confirmation. The image for the confirmation refers to an image for use in processing (confirmation printing processing) executed for confirming the images for the image forming before executing the production printing.

The procedure manual print mode information is information indicating timing of forming the image of the operation procedure manual on the sheet P.

The sheet discharge destination information is information regarding setting of the sheet discharge tray. The sheet feed tray information is information regarding setting of the sheet feed trays.

Subsequently, a description will be made of an example of the image information with reference to FIG. 4.

The image information comprises page information, page header information, and the image data. The page header information and the image data are composed for each page. The page information is information indicating the number of pages of the images. The page header information is composed of size information, attribute information and the like of the images. The size information of the images is information indicating sizes of the images. The attribute information is information indicating attributes of the images. For example, when the images are the images of the operation procedure manual, the attribute information becomes "procedure manual". Moreover, when the images are the images for the image forming, the attribute information becomes "for use in image forming". The image data is data of the images read by the original reading unit 20.

Subsequently, a description will be made of operations of the image forming apparatus 1. FIG. 5 shows a flow of image forming processing executed in the image forming apparatus 1.

In the image forming apparatus 1, the image forming processing is executed by cooperation between the CPU and the image forming program that is read out from the nonvolatile memory 120 and appropriately expanded in the RAM 130, for example, by taking a signal generated by instructing execution of the image forming processing through the operation display unit 30 by the user, as a trigger.

It is assumed that the job information including the setting information and the image information is received from the PC 2 through the LANIF 14 in advance.

First, the print mode information included in the setting information of the received job information is referred to, and the print mode information is determined (Step S11). When it is determined that the print mode information is the confirmation print information, the confirmation printing processing is executed (Step S12). The confirmation printing processing refers to printing processing for testing, which is executed before the production printing. In the confirmation printing processing, image data of the image for the confirmation is formed on the sheet P.

After the execution of Step S12, a setting confirmation screen G1 is displayed (Step S13). For example, the setting confirmation screen G1 shown in FIG. 6 is displayed on the LCD 31. The setting confirmation screen G1 has a procedure manual output button B1. The procedure manual output button B1 is a button for setting whether or not to form the image of the operation procedure manual on the sheet P. When the procedure manual output button B1 is depressed, the printing processing is performed only for the procedure manual to be described later.

After the execution of Step S13, it is determined whether or not to form the image of the procedure manual (Step S14). Specifically, based on whether or not the procedure manual output button E1 is depressed on the setting confirmation screen G1 displayed on the LCD 31 in Step S13, the determination in Step S14 is performed.

When it is determined to form the image of the procedure manual in Step S14 (Step S14: YES), the printing processing is executed only for the procedure manual (Step S15). The printing processing only for the procedure manual refers to processing for forming only the image of the operation procedure manual on the sheet P. Then, after the execution of Step S15, the processing proceeds to Step S13.

When it is determined not to form the image of the procedure manual in Step S14 (Step S14: NO), the processing proceeds to Step S11.

When it is determined that the print mode information is production print information in Step S11 (Step S11: production print information), the production printing processing is executed (Step S16). The production print processing is processing for forming the images for the image forming on the sheets P. After the execution of Step S16, the image forming processing is ended.

Subsequently, a description will be made of the production printing processing executed in Step S16 of the image forming processing with reference to FIG. 7.

First, a page of the image of the procedure manual is set as an image forming skip page (P=xx) (Step S21). The image forming skip page refers to a page of which image is not formed on the sheet P. In this step, for example, the attribute information of the image information of the job information is referred to, and it is identified whether or not the attribute information is the "procedure manual". Then, the page in which the attribute information is identified to be the "procedure manual" is set as the image forming skip page (P=xx).

After the execution of Step S21, a starting page is set as an image forming page (P=1) (Step S22). The starting page refers to a page in which the page information indicates a first page. The image forming page refers to a page of which image is formed on the sheet P. Then, it is determined whether or not the page information corresponds to the image forming skip page (Step S23). Specifically, it is determined whether or not the page information of the image forming skip page set in Step S21 and the page information of the image forming page set in Step S22 coincide with each other. For example, when the attribute information of the first page is the "procedure manual" in Step S21, the first page is set as the image forming skip page. In this case, the image forming skip page set in Step S21 and the image forming page set in Step S22 coincide with each other.

When it is determined that the page P is not the image forming skip page in Step S23 (Step S23: NO), the image is formed on the page P (Step S24). When it is determined that the page P is the image forming skip page in Step S23 (Step S23: YES), the processing proceeds to step S25.

After the execution of Step S24, a next page is set as the image forming page (P=P+1) (Step S25). Then, the received job information is referred to, and it is determined whether or not the page is a final page (Step S26). When it is determined that the page is not the final page (Step S26: NO), the processing proceeds to Step S22. When it is determined that the page is the final page (Step S26: YES), the number of sheets P, which is included in the job information, is counted up (Step S27). After the execution of Step S27, the job information is referred to, and it is determined whether or not the number is a final number (Step S28). Specifically, a value of the number counted up in Step S27 and a value of a set number included in the job information are referred to, and the determination in this step is executed. When it is determined that the number is not the final number in Step S28 (Step S28: NO), the processing proceeds to Step S22. When it is determined that the number is the final number (Step S28: YES), the production printing processing is ended.

Figure 8:
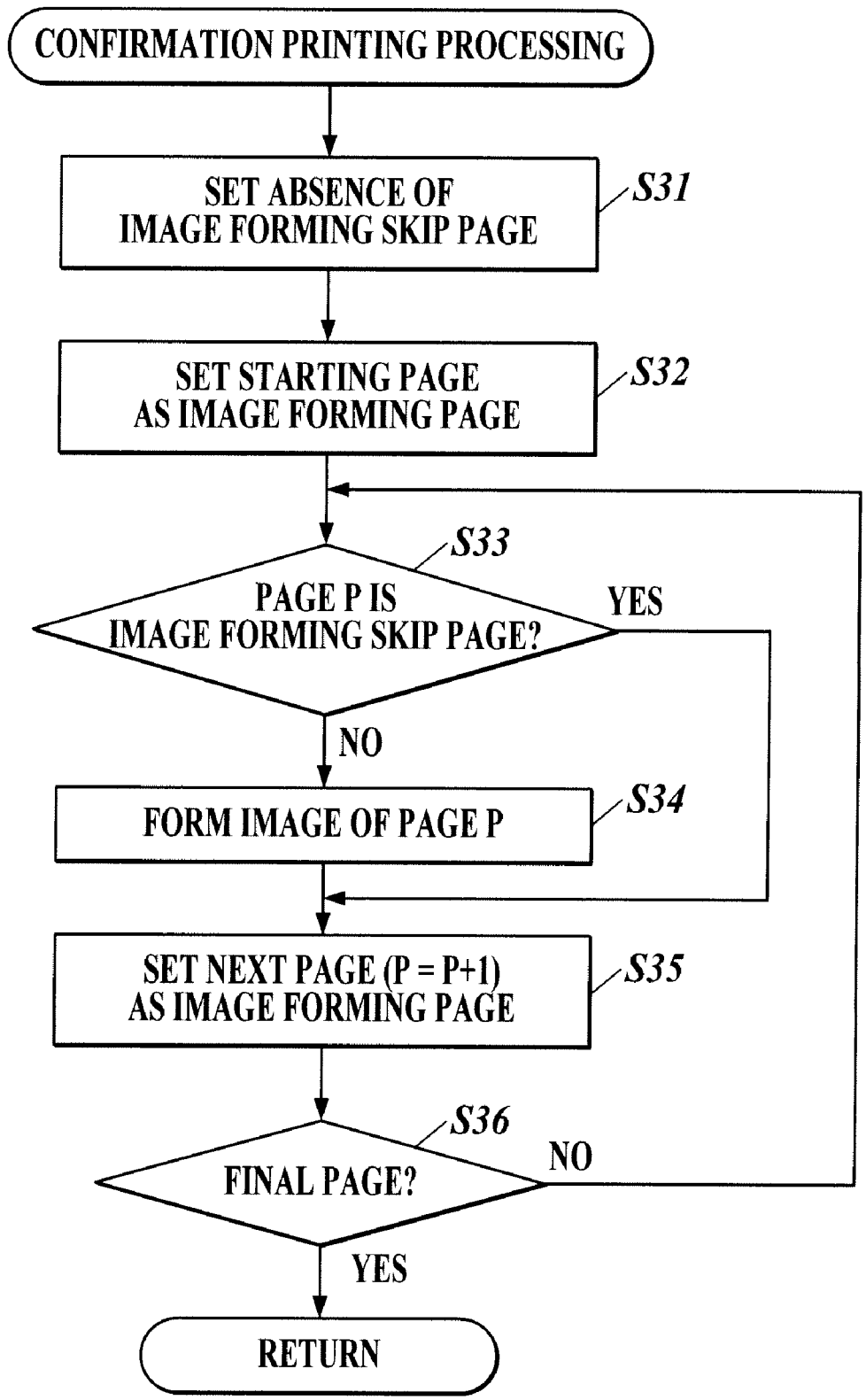
FIG. 8 is a flowchart showing a flow of confirmation printing processing.
Figure 9:
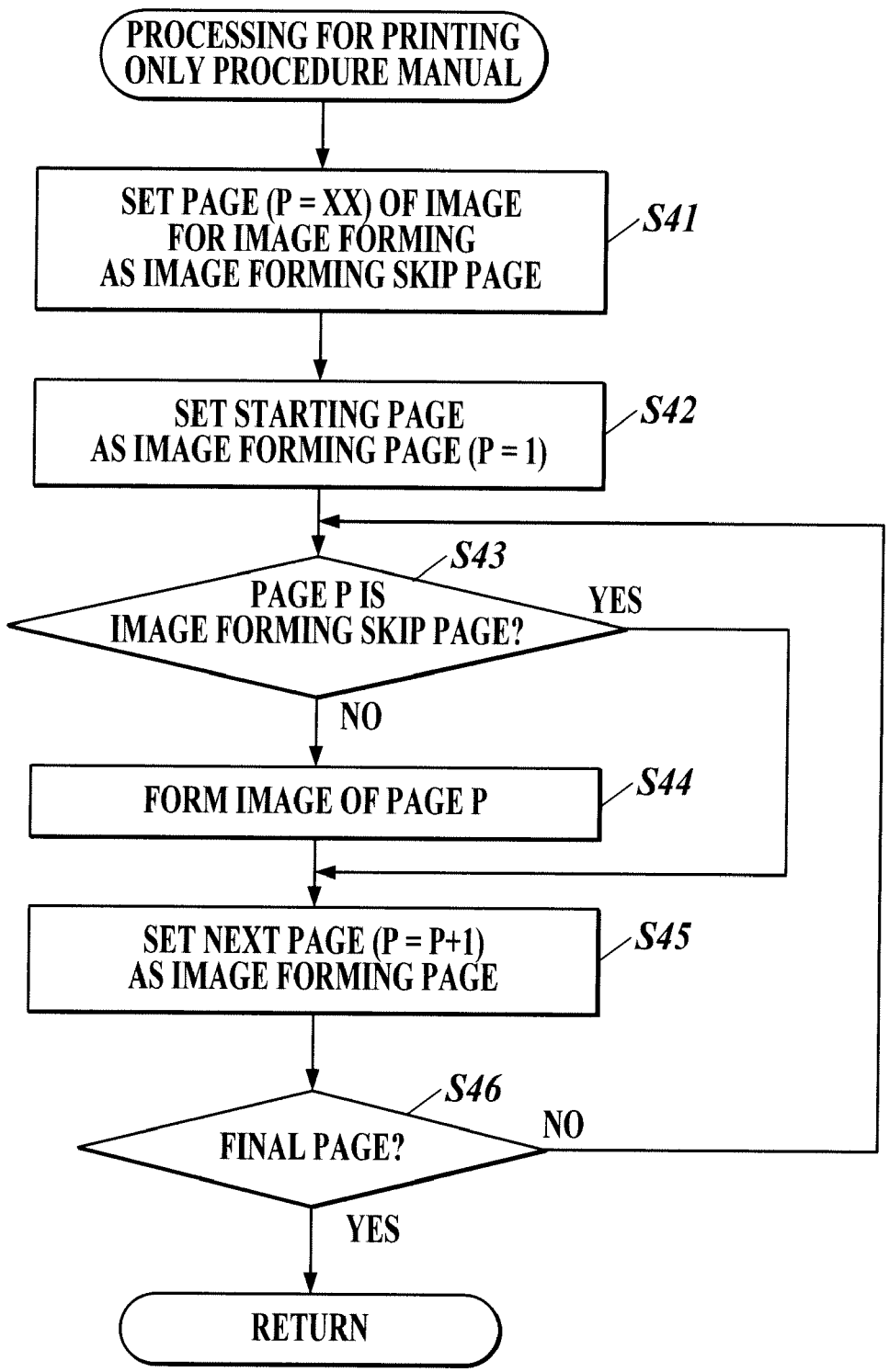
FIG. 9 is a flowchart showing a flow of printing processing only for a procedure manual.

Subsequently, a description will be made of the confirmation printing processing executed in Step S12 of the image forming processing with reference to FIG. 8.

First, the image information is referred to, and absence of the image forming skip page is set for a page of the image for the confirmation (Step S31). For example, information for identifying the page of the image for the confirmation is included in the page header information of the image information, and this step is executed by referring to the page header information.

Steps S32 to S36 are similar to Steps S22 to S26 of the production printing processing. After execution of Step S36, the confirmation printing processing is ended, and the processing proceeds to Step S13 of the image forming processing.

Subsequently, a description will be made of the processing for forming only the image of the operation procedure manual, which is executed in Step S15 of the image forming processing.

First, the job information is referred to, and the pages of the images for the image forming are set as the image forming skip pages (Step S41). For example, when the attribute information of the first page is the "procedure manual", the second page and after become the pages of the images for the image forming. Hence, the second page and after are set as the image forming skip pages.

Steps S42 to S46 are similar to Steps S22 to S26 of the production printing processing. After execution of Step S46, the processing for printing only the procedure manual is ended, and the processing proceeds to Step S13 of the image forming processing.

As described above, in accordance with this embodiment, the image forming unit 43 is allowed to form the image based on the type of the image, which is identified based on the attribute information, and based on the timing, which is determined based on the print mode information. In such a way, the specific image (the image of the operation procedure manual or the images for the image forming) can be identified from among the plurality of images based on the attribute information, and the timing of forming the specific image (the image of the operation procedure manual or the images for the image forming) on the sheet P can be determined based on the print mode information. Accordingly, the specific image can be formed on the sheet P at the appropriate timing. Hence, if the user sets the type of the image and the timing of forming the image on the sheet P in the job information in advance, then the user can form the specific image, which is desired by the user, on the sheet P at the appropriate timing desired by the user.

Moreover, at the timing of forming the image of the operation procedure manual on the sheet P, only the image of the operation procedure manual is formed thereon, and at the timing of forming the images for the image forming on the sheets P, only the images for the image forming are formed thereon. In such a way, the user can form only the image of the operation procedure manual when the user desires to form only the image of the operation procedure manual, and can form only the images for the image forming when the user desires to form only the images for the image forming.

Furthermore, at the timing of forming the image for the confirmation on the sheet P, the image for the confirmation is formed. In such a way, the user can form the image for the confirmation when the user desires to form the image for the confirmation.

Moreover, if the user sets the "procedure manual" and the "for the image confirmation" in the attribute information in advance, then the user can identify the image of the operation procedure manual and the images for the image forming based on the attribute information.

Note that the descriptions in the above embodiment are merely examples of the image forming apparatus 1 according to the present invention, and the present invention is not limited to this.

For example, in the above embodiment, it has been described that the attribute information included in the job information is referred to, and that the page in which the attribute information is the "procedure manual" is the image of the operation procedure manual; however, the present invention is not limited to this. For example, the user may set the first page in the page information as the image of the operation procedure manual, and may execute the image forming processing while using the set first page of the page information as the image of the operation procedure manual. In such a way, the image of the operation procedure manual and the images for the image forming can be identified based on the page information.

Moreover, in the above embodiment, it has been described that the processing for printing only the procedure manual is executed when the print mode information is the confirmation print information and the instruction to form the image of the operation procedure manual is inputted on the setting confirmation screen G1; however, the present invention is not limited to this. For example, when the print mode information is the procedure manual print mode information, the processing for printing only the procedure manual may be executed.

In the above description, the embodiment in which the nonvolatile memory 120 is used as a computer-readable medium for the programs according to the present invention, has been disclosed; however, the present invention is not limited to this embodiment.

As other computer-readable media, a nonvolatile memory such as a flash memory and a portable storage medium such as a CD-ROM are applicable.

Moreover, as a medium that provides the data of the programs according to the present invention through a communication network, a carrier wave is also applied to the present invention.

Besides the above, detailed configurations and detailed operations of the image forming apparatus 1 in the above-described embodiment can be also appropriately modified within the scope without departing from the gist of the present invention.

In accordance with an aspect of a preferred embodiment of the present invention, an image forming apparatus comprises:

an image forming unit for forming a plurality of images on sheets;

a receiving unit for receiving job information including identification information for identifying types of the plurality of images and determination information for determining timing of forming the plurality of images on the sheets, from an external instrument; and a control unit for identifying the types of the plurality of images based on the identification information received by the receiving unit, determining the timing of forming the plurality of images on the sheets based on the determination information received by the receiving unit, and allowing the image forming unit to form the plurality of images based on the identified types of the images and on the determined timing.

In this image forming apparatus, the image forming unit is allowed to form the images based on the types of the images, which are identified based on the identification information, and on the timing determined based on the determination information. In such a way, the specific image can be identified from among the plurality of images based on the identification information, and the timing of forming the specific image on the sheet can be determined based on the determination information. Accordingly, the specific image can be formed on the sheet at the appropriate timing. Hence, if the user sets the types of the images and the timing of forming the images on the sheets in the job information in advance, then the user can form the specific image, which is desired by the user, on the sheet at the appropriate timing desired by the user.

Preferably, the control unit identifies a specific image and the other images from the plurality of images based on the identification information, when the timing of forming the specific image on the sheet is determined based on the determination information, the control unit allows the image forming unit to form the specific image and does not allow the image forming unit to form the other images, and when the timing of forming the other images on the sheets is determined based on the determination information, the control unit allows the image forming unit to form the other images and does not allow the image forming unit to form the specific image.

In this image forming apparatus, only the specific image is formed at the timing of forming the specific image on the sheet, and only the other images are formed at the timing of forming the other images on the sheets. In such a way, the user can form only the specific image when the user desires to form only the specific image, and can form only the other images when the user desires to form only the other images.

Preferably, the identification information is attribute information indicating attributes of the plurality of images, and the control unit identifies the specific image and the other images based on the attribute information.

In this image forming apparatus, the specific image and the other images are identified based on the attribute information. In such a way, if the user sets information regarding the specific image and information regarding the other images in the attribute information in advance, then the user can identify the specific image and the other images based on the attribute information.

Preferably, the identification information is page information indicating the number of pages of the plurality of images, and the control unit identifies the specific image and the other images based on the page information.

In accordance with this invention, the specific image and the other images are identified based on the page information. In such a way, if the user sets the information regarding the specific image and the information regarding the other images in the page information in advance, then the user can identify the specific image and the other images with each other the page information.

The present U.S. patent application claims the priority of Japanese Patent Application No. 2008-142156 filed on May 30, 2008, according to the Paris Convention, and the above Japanese Patent Application is the basis for correcting mistranslation of the present U.S. patent application.

What is claimed is:

1. An image forming apparatus comprising:
   an image forming unit capable of forming a plurality of images on sheets;
   a receiving unit for receiving job information including identification information for identifying types of the plurality of images and determination information for determining timings at which the plurality of images are respectively to be formed on the sheets, from an external instrument; and
   a control unit for,
      identifying the types of the plurality of images based on the identification information received by the receiving unit,
      determining the timings at which the plurality of images are respectively to be formed based on the determination information received by the receiving unit, and
      controlling whether to allow the image forming unit to form images of all of the identified types or to form images of not all of the identified types based on the determined timing, when the types of the plurality of images are identified as being more than one.

2. The image forming apparatus of claim 1,
wherein the control unit identifies a specific image and the other images from the plurality of images based on the identification information;
wherein the control unit allows the image forming unit to form the specific image and does not allow the image forming unit to form the other images, when the timing at which the specific image is to be formed on the sheet is determined based on the determination information; and wherein the control unit allows the image forming unit to form the other images and does not allow the image forming unit to form the specific image, when the timings at which the other images are to be formed on the sheets is determined based on the determination information.

3. The image forming apparatus of claim 2,
wherein the identification information is attribute information indicating attributes of the plurality of images, and
the control unit identifies the specific image and the other images based on the attribute information.

4. The image forming apparatus of claim 2,
wherein the identification information is page information indicating the number of pages of the plurality of images, and
the control unit identifies the specific image and the other images based on the page information.

* * * * *